US007653754B2

(12) United States Patent
Kagan et al.

(10) Patent No.: US 7,653,754 B2
(45) Date of Patent: Jan. 26, 2010

(54) METHOD, SYSTEM AND PROTOCOL THAT ENABLE UNRESTRICTED USER-LEVEL ACCESS TO A NETWORK INTERFACE ADAPTER

(75) Inventors: Michael Kagan, Zichron Yaakov (IL); Benny Koren, Zichron Yaakov (IL); Dror Goldenberg, Zichron Yaakov (IL); Gilad Shainer, Karkoor (IL); Gil Bloch, Kiryat Ata (IL); Ariel Shachar, Jerusalem (IL); Ophir Turbovich, Haifa (IL); Dror Borer, Nesher (IL); Diego Crupnicoff, Buenos Aires (AR)

(73) Assignee: Mellanox Technologies Ltd., Ramat Gan (IL)

( * ) Notice: Subject to any disclaimer, the term of this patent is extended or adjusted under 35 U.S.C. 154(b) by 679 days.

(21) Appl. No.: 10/750,762

(22) Filed: Jan. 5, 2004

(65) Prior Publication Data

US 2005/0198410 A1 Sep. 8, 2005

(51) Int. Cl.
*G06F 15/16* (2006.01)
(52) U.S. Cl. .................................... 709/250
(58) Field of Classification Search ............... 709/250
See application file for complete search history.

(56) References Cited

U.S. PATENT DOCUMENTS 6,347,337 B1 *   2/2002   Shah et al. ............. 709/224
6,888,792 B2 *   5/2005   Gronke ................... 370/227
2002/0150106 A1* 10/2002  Kagan et al. ............ 370/395.6
2002/0165897 A1* 11/2002  Kagan et al. ............ 709/102

OTHER PUBLICATIONS

Buonadonna et al., "Queue pair IP: a hybrid architecture for system area networks", Computer Architecture, 2002. Proceedings. 29th Annual International Symposium on May 25-29, 2002 pp. 247-256.*
Dunning et al., "The Virtual Interface Architecture", Micro, IEEE vol. 18, Issue 2, Mar.-Apr. 1998 pp. 66-76.*

* cited by examiner

*Primary Examiner*—Vivek Srivastava
*Assistant Examiner*—William J Goodchild
(74) *Attorney, Agent, or Firm*—Mark M. Friedman (57) ABSTRACT

A method for preventing deadlock in communication between a host software application and a network interface card (NIC), comprises writing a doorbell associated with at least one descriptor having a descriptor context to a buffer in the NIC, dropping at least one doorbell from the buffer if the buffer is full, thereby allowing a write of a new doorbell to the buffer, and recovering each dropped doorbell for further execution of descriptors associated with this doorbell. The descriptor execution is in order of posting by the application to the NIC. A system implementing the method comprises a doorbell drop mechanism and a doorbell recovery mechanism.

17 Claims, 6 Drawing Sheets

METHOD, SYSTEM AND PROTOCOL THAT ENABLE UNRESTRICTED USER-LEVEL ACCESS TO A NETWORK INTERFACE ADAPTER

FIELD OF THE INVENTION

The present invention relates generally to computer systems, and more specifically to the architecture of software (SW)/hardware (HW) protocols used when a host SW application communicates with a network interface adapter, also known as a network interface card (NIC).

BACKGROUND OF THE INVENTION

Direct memory access (DMA) is an efficient means for transferring data to and from a memory without direct involvement of a central processing unit (CPU). A DMA engine performs the desired data transfer operations as specified by DMA instructions, known as descriptors. The descriptors typically indicate, for each operation, a source address from which to read the data, and information regarding disposition of the data. The descriptors are commonly organized in memory as a linked list, or chain, in which each descriptor contains a field indicating the address in the memory of the next descriptor to be executed.

In order to initiate a chain of DMA data transfers, a software application program running on a CPU prepares the appropriate chain of descriptors in a memory accessible to the DMA engine. The CPU then sends a message to the DMA engine indicating the memory address of the first descriptor in the chain, which is a request to the DMA engine to start execution of the descriptors. The application typically sends the message to the "doorbell" (DB) of the DMA engine—a control register with a certain bus address that is specified for this purpose. Sending such a message to initiate DMA execution is known as "ringing the doorbell" of the DMA engine. The DMA engine responds by reading and executing the first descriptor. The engine follows the "next" field through the linked list until execution of the descriptors is completed or terminated for some other reason. Note that one or more descriptors can be associated with a single doorbell.

DMA is used in modern network communication adapters to interface between host computer systems and packet networks. In this case, the host prepares descriptors defining messages to be sent over the network and rings a doorbell of the communication adapter to indicate that the descriptors are ready for execution. The descriptors typically identify data in the host system memory that are to be inserted in the packets. During execution of the descriptors, the DMA engine in the adapter reads the identified data from the memory. The adapter then adds appropriate protocol headers and sends packets out over the network corresponding to the messages specified by the descriptors.

Packet network communication adapters are a central element in new high-speed, packetized, serial input/output (I/O) bus architectures that are gaining acceptance in the computer industry. In these systems, computing hosts and peripherals are linked together by a switching network, commonly referred to as a switching fabric, taking the place of parallel buses that are used in legacy systems. A number of architectures of this type have been proposed, culminating in the "InfiniBand™" (IB) architecture, which is described in detail in the *InfiniBand Architecture Specification*, Release 1.0 (October, 2000), which is incorporated herein by reference. This document is available from the InfiniBand Trade Association at www.infinibandta.org.

A host connects to a switching fabric (e.g. the IB fabric) via a NIC, which is referred to in IB parlance as a host channel adapter (HCA). When an IB "consumer" i.e. the user-mode application software which is running on the host, needs to open a communication channel with some other entity via the IB fabric, it instructs the NIC to provide the necessary transport service resources by allocating a transport service instance, or queue pair (QP), for its use. Each QP has a Send Queue (SQ) and a Receive Queue (RQ) and is configured with a context that includes information such as the destination address (referred to as the local identifier, or LID) for the QP, service type, and negotiated operating limits. Communication over the fabric takes place between a source QP and a destination QP, so that the QP serves as a sort of virtual communication port for the consumer.

In order to send and receive communications over the IB fabric, the consumer initiates a work request (WR) on a specific QP. There are a number of different WR types, including send/receive and remote DMA (RDMA) "read" and "write" operations, used to transmit and receive data to and from other entities over the fabric. WRs of these types typically include a gather list, indicating the locations in system memory from which data are to be read by the NIC for inclusion in the packet, or a scatter list, indicating the locations in the memory to which the data are to be written by the NIC. When consumer submits a WR, it causes a work item, called a work queue element (WQE), to be placed in the appropriate queue of the specified QP in the NIC. The WQE is a descriptor in IB parlance. The NIC then executes the WQE (descriptor), including carrying out DMA operations specified by the gather or scatter list submitted in the WR. "Descriptor" is used hereafter as a general term and includes WQEs.

User-level access to a NIC translates into management of descriptors by non-trusted code. Thus, the NIC is obliged to assure that only legal operations are performed by every application ("legal" and "illegal" defined by the operating system (OS) in context tables), and that if an application executes an illegal operation it cannot hurt any other application.

As mentioned, a doorbell is essentially a "write" to a control register of the NIC indicating that a descriptor (or a chain of descriptors) has been posted to the NIC for execution. This write is possible without a kernel call. In order to process the doorbell, the NIC needs to read QP context memory. The response to this read request is called a "read response". In parallel (or independently), the host CPU can keep ringing doorbells. As shown in and discussed below with reference to FIGS. 1 and 2, a "deadlock" occurs if the write operation (doorbell ring) logical path and the read response logical path overlap, since PCI ordering rules do not enable the read response to return when both "writes" and "reads" use the same logical path (i.e. read responses cannot bypass writes). The common logical path is referred to hereafter as a "write/read path". More detailed descriptions of doorbells and doorbell handling as well as of the general architecture and communication between host, interface adapter and switch fabric may be found in U.S. patent application Ser. No. 10/052,000 entitled "Doorbell handling with priority processing function" by M. Kagan et al. filed Jan. 23, 2002, and U.S. patent application Ser. No. 10/118,941 entitled "Network adapter with shared database for message context information" to M. Kagan et al., filed Apr. 10, 2002 which are incorporated herein by reference.

Figure 1:
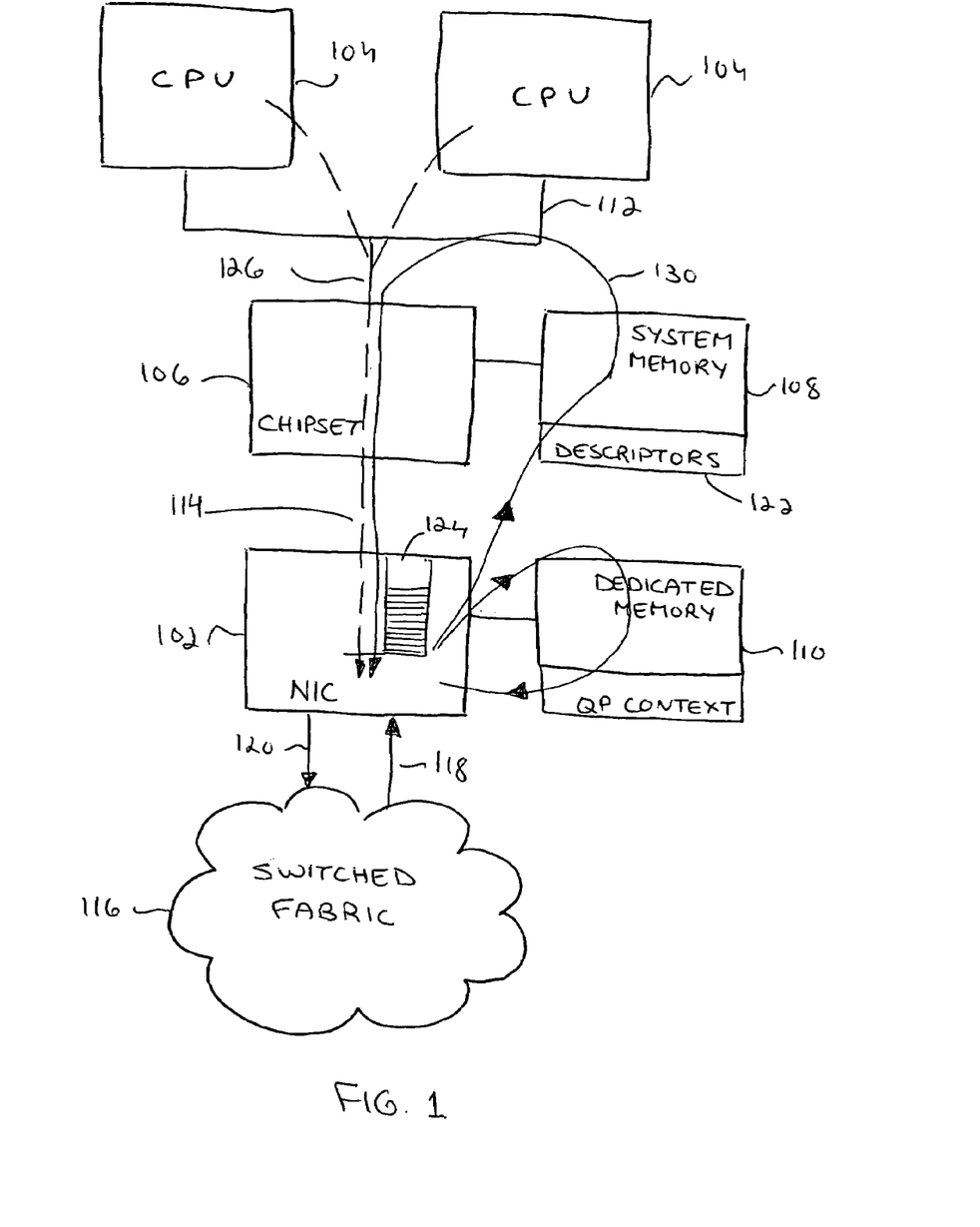
FIG. 1 shows a schematic topology of a prior art system that uses separate write and read paths and a dedicated memory.

FIG. 1 shows a schematic topology of a prior art system 100 in which a host processor communicates with a NIC. System 100 comprises a NIC 102, at least one host processor (CPU) 104, a chipset (memory controller) 106, a system memory 108, and a dedicated memory 110 attached to the NIC. NIC 102 communicates with the host through a host interface 112 from the chipset to the host, and a communication bus, preferably a Peripheral Component Interface (PCI) bus 114, as well known in the art. The NIC is further connected to a switched fabric 116 through an input port 118 and an output port 120.

Descriptors are stored in a buffer 122 in system memory 108. The QP context is preferably stored in the dedicated memory, although a system memory QP context storage is also known, see the "Network adapter with shared database for message context information" application above. Doorbells received by the NIC HW from SW are temporally stored in a buffer 124 of the NIC, preferably a first-in first-out (FIFO) buffer. The system has a logical DB write path 126 (dashed line) between each host CPU and the NIC, and a separate context extraction path 128 between the NIC attached memory and the NIC. In case the context is stored in system memory, there is a single write/read path.

Figure 2:
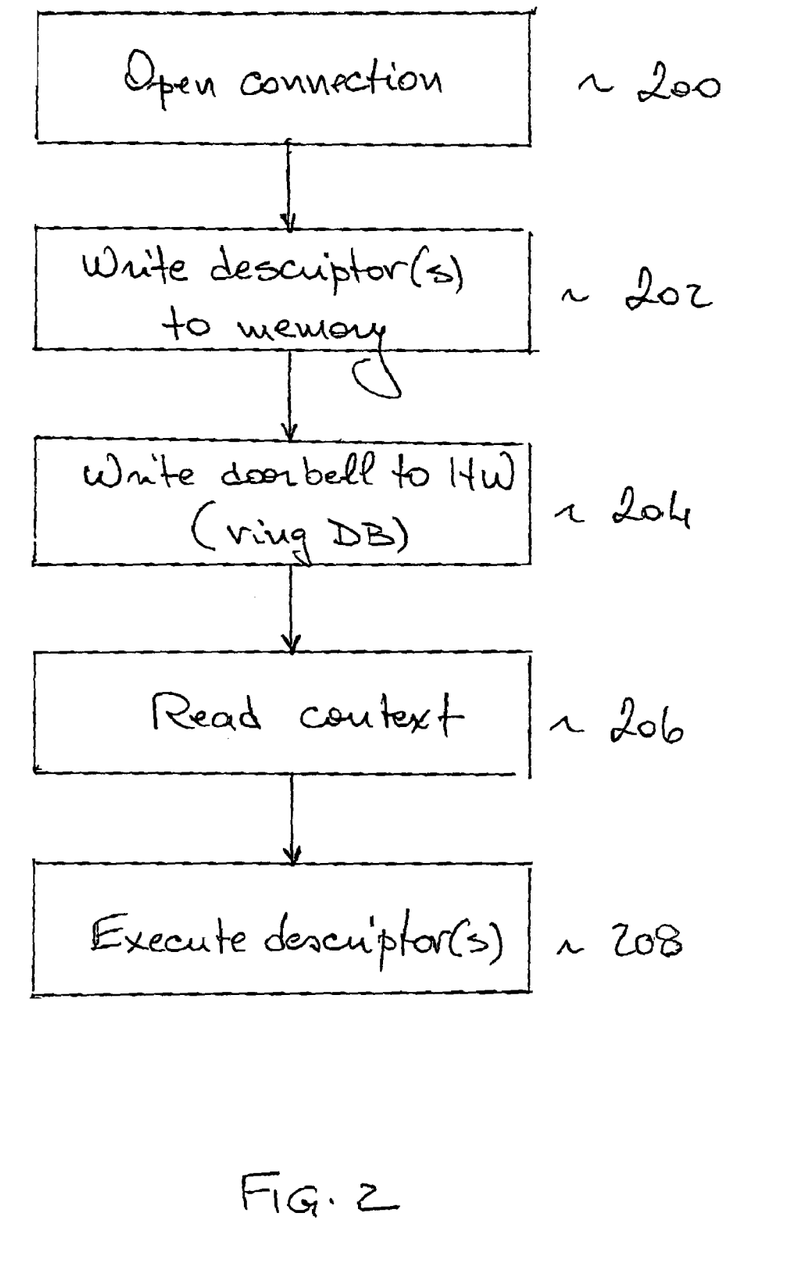
FIG. 2 is a flow chart of a standard doorbell ringing and descriptor execution process.

FIG. 2 is a flow-chart of a standard doorbell ringing and descriptor execution protocol, which uses separate DB write and context read response paths. The application SW running on the host opens (sets-up) a connection to another peer on the network and writes QP context to memory in a step 200. The application SW then writes a descriptor to system memory in a step 202, and writes a doorbell that prompts the NIC HW to execute this descriptor in a step 204. The doorbell is written to a doorbell buffer, preferably a FIFO buffer. The NIC reads the QP context from its attached memory in a step 206, and the descriptor is executed in a step 208. In this commonly used protocol, doorbell writes acceptance by the NIC HW is unconditional—the basic assumption is that each doorbell write is accepted as it arrives. The system makes sure that read responses needed to process this doorbell use a different path, thus preventing deadlock. However, this commonly used system has a main disadvantage in the need for an additional, separate memory attached to the NIC.

In a prior art system that uses a single write/read path, the software must guarantee that the doorbell FIFO buffer is never full. This guarantee is provided by synchronizing all consumers through the OS, i.e. by using a kernel call. Disadvantageously, this implies restricted access to the NIC HW, and inherent increased overhead requirements.

In summary, all prior art solutions to the DB write/QP context read response deadlock problem are based either on the use of separate write and read response paths, or on synchronization between consumers using a kernel call. The main disadvantage of the first solution is the need for the additional, separate memory attached to the NIC. The main disadvantages of the second solution are restricted access to the NIC and additional overhead.

There is therefore a widely recognized need for, and it would be highly advantageous to have, a method, system and protocol that solve the doorbell deadlock condition without requiring either separate write and read paths or synchronization between users.

SUMMARY OF THE INVENTION

The present invention discloses a method, system and protocol that enable use of a single logical path for both doorbell writing from a host SW application to a NIC and for QP context reading by the NIC from system memory. Using the method, system and protocol disclosed herein, a network adapter is capable of holding multi-million connections simultaneously, enabling user-level access (kernel bypass) and using a "push-push" (write) model for communication with a host. This is a proven way to get fastest performance. With the present method, system and protocol there is also no need for dedicated memory, and no need for synchronization between various user-level consumers using a kernel call.

According to the present invention there is provided a method for preventing deadlock in communication between a user running an application and a NIC, the method comprising steps of: writing a doorbell associated with at least one descriptor having a descriptor QP context to a buffer in the NIC; checking if the buffer is full, and if it is, dropping at least one doorbell from the buffer, thereby allowing a write of a new doorbell to the buffer instead of each dropped doorbell; and if the buffer is not full, executing each descriptor associated with the written doorbell in order of posting by the application, whereby the method enables unrestricted user-level access to the NIC.

According to the present invention there is provided a method for resolving communication deadlock arising from overlapping doorbell write and context read response logical paths, comprising steps of providing a single logical communication path common to the doorbell writes and QP context read responses, and facilitating unsynchronized, kernel-call-free, unrestricted traffic along the single common logical path, whereby the method enables unrestricted user-level access to a network interface adapter without having to use kernel calls.

According to the present invention there is provided a system that enables unrestricted user-level access to a network interface adapter, comprising a NIC configured to accept doorbell rings and read responses through a single logical path; at least one host CPU running at least one application, the CPU connected to the NIC through an interface bus, the application operative to write descriptors associated with said doorbell rings and to update a doorbell record in a system memory, the single logical path passing through said interface bus; and a kernel call-free mechanism for facilitating free traffic along the single logical path, whereby the NIC configuration removes the need for a separate context storage memory attached to the NIC and whereby the kernel call-free mechanism allows a practically unlimited number of users to access the NIC simultaneously without a kernel call.

According to the present invention there is provided a method for obtaining kernel call-free access from a plurality of users that post doorbells to a doorbell buffer in a network interface adapter, the adapter having to obtain read responses from a system memory to allow execution of descriptors associated with each such doorbell, the method comprising steps of: responsive to a first check, dropping at least one doorbell from the doorbell buffer if the buffer is full, thereby providing space in the buffer for a respective new doorbell; recovering each dropped doorbell and executing its respective associated descriptors; and responsive to the same said first check, if the doorbell buffer is not full, checking if a doorbell is a repeat doorbell, and executing descriptors of each doorbell found to be not a repeat doorbell.

DETAILED DESCRIPTION OF THE PREFERRED EMBODIMENTS

The present invention relates to a system, method and software/hardware interface protocol that enable practically unrestricted user-level access to a communications network (through a NIC) without compromising performance. The performance delivered is equal to that obtained when the management of descriptors is done by trusted code. In order to prevent the doorbell write/context read response deadlock described above, the method, system and protocol of the present invention enable the NIC to drop some doorbells, thereby "cleaning up" a clogged read response path. This means that only one logical path without use of a kernel call is needed for both doorbell write and QP read response processes. This is a paradigm shift, representing a key novel and innovative feature of the method. We call this common path a "kernel call-free" path. All doorbells (including the dropped ones) are written by SW to (replicated in) a doorbell record, prior to ringing the doorbell. The DB record is a data structure located in system memory. This replication can be used by the NIC when it has to recover dropped (or "recovering from dropping") doorbells. Recovery occurs without neither the NIC nor the CPU having their operation affected during the recovery period (minimal intervention). Dropped doorbells are recovered without affecting other connections for which doorbells were not dropped. This is another key novel and innovative feature of the method. The mechanism used for dropping and recovering doorbells is referred to hereafter as "kernel call-free" drop and recovery mechanism.

Figure 3:
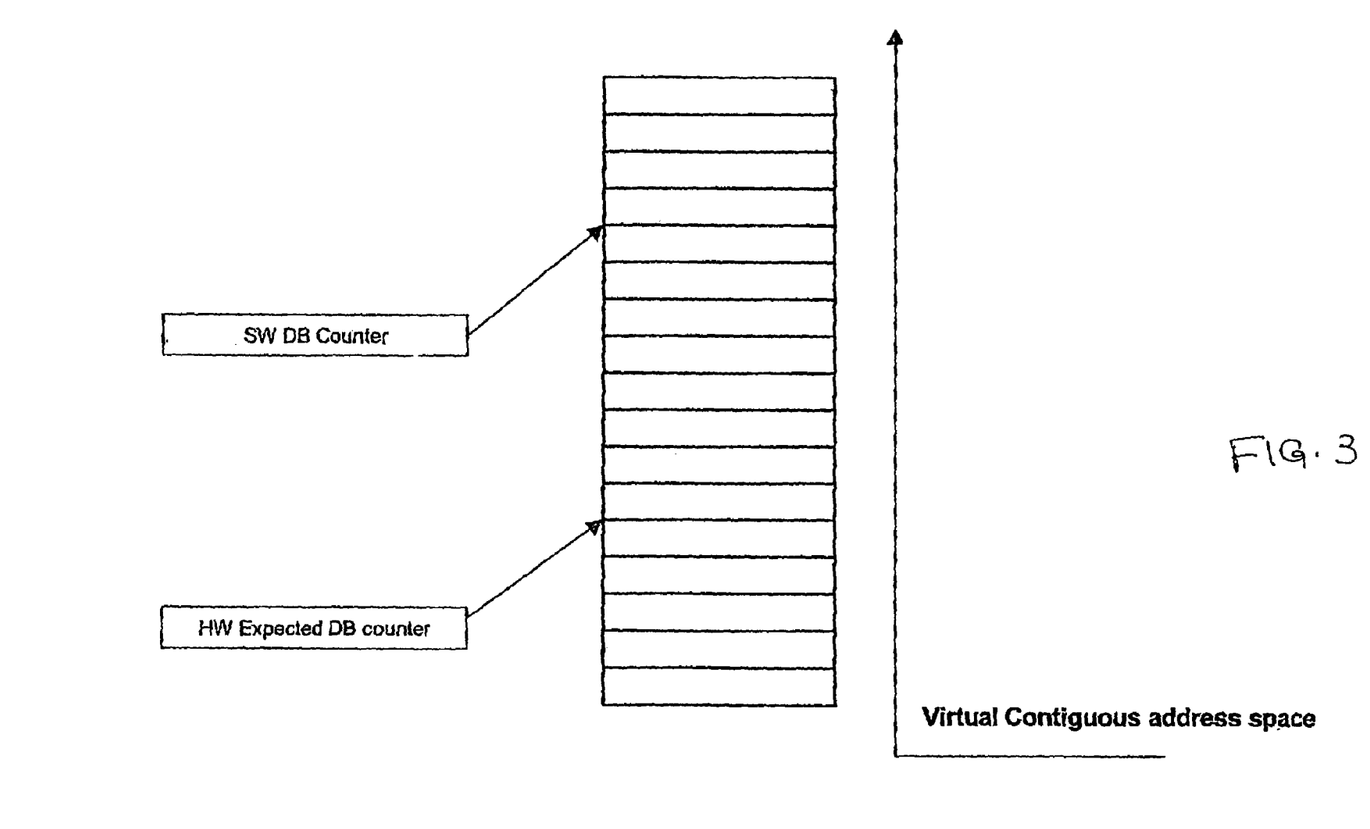
FIG. 3 is a schematic description of a descriptor cyclic buffer structure.

The recovery algorithm (mechanism) uses two counters shown in FIG. 3: the first, a "SW DB counter" equals the total number of rung doorbells, is incremented by SW for every descriptor posted on the QP, maintained in the doorbell record in system memory and is written in the doorbell (i.e. part of the doorbell message). The second, a "HW Expected DB counter" equals a doorbell index expected by the HW, is located in the QP context, is maintained by the NIC HW and latches the value written in the last doorbell that was successfully received from the SW.

Although doorbells are dropped, descriptors are executed in the order in which they are posted by the application program (order of posting), not in the order they are received by the NIC (because of possible drops). Advantageously, the method resolves the deadlock without requiring a dedicated NIC external memory, i.e. the system operates in a memory-free or "mem-free" mode.

Figure 4:
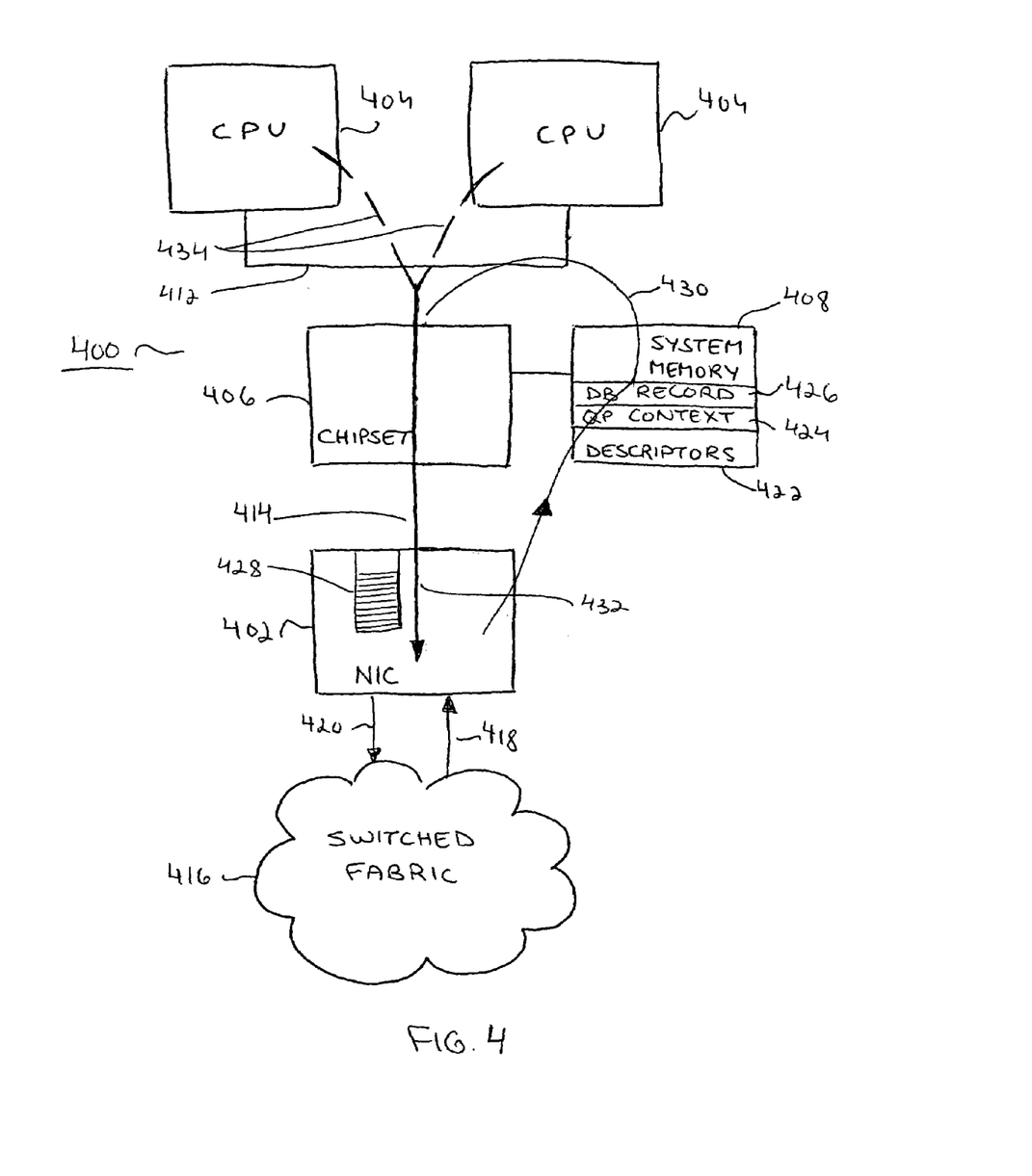
FIG. 4 shows a schematic topology of an embodiment of the system of the present invention that uses a single write/read path.

FIG. 4 shows a schematic topology of an embodiment of a system 400 of the present invention that uses a single write/read path. In common with FIG. 1, system 400 comprises a NIC 402, at least one host processor (CPU) 404, a chipset (memory controller) 406, and a system memory 408. NIC 402 communicates with the host through a host interface 412 from the chipset to the host, and a communication bus, preferably a Peripheral Component Interface (PCI) bus 414 from the chipset to the NIC, as well known in the art. The NIC is further connected to a switched fabric 416 through an input port 418 and an output port 420. In a preferred case, the switched fabric is an IB fabric, and the NIC is an HCA.

As in the system of FIG. 1, descriptors are stored in a buffer in a system memory 422. In contrast with system 100, system 400 does not have a dedicated memory attached to the NIC, and therefore must store QP context information 424 in the system memory. The system memory further stores a doorbell record 426. Doorbells received by the NIC HW from the host SW are temporally stored in a doorbell buffer, preferably a FIFO buffer 428. As a result, read responses involve traffic 430 between the system memory and the NIC and therefore share a single logical path 432 through bus 414 with writes 434 from CPU 404. Without the provision of the deadlock resolution method disclosed herein, such a system must have user synchronization employing a kernel call to prevent deadlock, as explained above.

Figure 5:
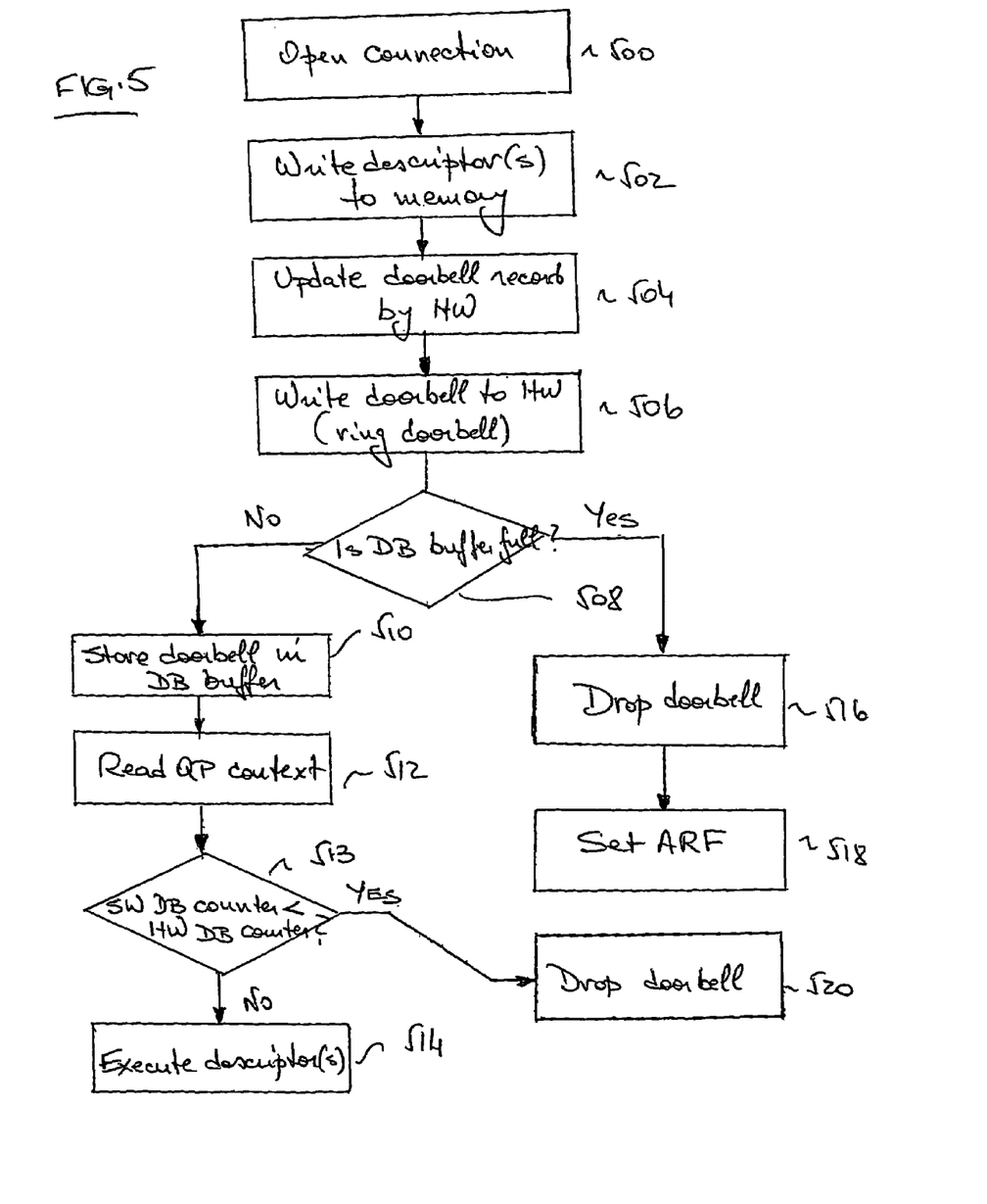
FIG. 5 a flow chart listing the main steps of the doorbell deadlock resolution method of the present invention.

FIG. 5 shows a flow chart listing the main steps of the doorbell deadlock resolution method of the present invention. In common with prior art methods, the OS opens a connection and writes QP context to memory in a step 500. The application SW then writes descriptors to system memory in a step 502. Unlike in prior art, the software updates a doorbell record with a doorbell associated with one or more descriptors in a step 504. The application then writes the doorbell to the NIC HW in a step 506. When the doorbell is received by the NIC, a first checking mechanism checks if the DB buffer is full in a step 508. In response to this first check, if the buffer is full, a doorbell is dropped in a step 516. The dropped doorbell is preferably the last doorbell input into the FIFO buffer. However, in principle, the dropped doorbell may be any doorbell in the buffer, for example the first doorbell. In general, more than one doorbell may be dropped to make room for more than one new doorbell in the buffer. The NIC HW then sets an activate recovery flag (ARF) (lights a bit) in a step 516, triggering a recovery algorithm running in the NIC. A set ARF indicates that a doorbell was dropped. The recovery of dropped doorbell(s) then proceeds as explained in detail with reference to FIG. 6.

If the buffer is not full, the doorbell is stored in the doorbell buffer in a step 510 and the NIC reads the QP context from system memory in a step 512. The NIC checks if the SW DB counter value (which was extracted from the DB record) is smaller than the HW DB counter value (which was extracted from the QP context) in a second check step 513. The purpose of the check is to detect "repeat" doorbells, i.e. DBs that were already processed by the NIC HW due to a prior activation of the recovery mechanism. The checking condition is explained in more detail with regard to FIG. 6 below. If the second check is successful (Yes, meaning the doorbell is a "repeat" DB) the doorbell is dropped. If the second check is unsuccessful (No, the doorbell is not a "repeat" DB), the associated descriptor(s) is (are) executed in a step 514.

Figure 6:
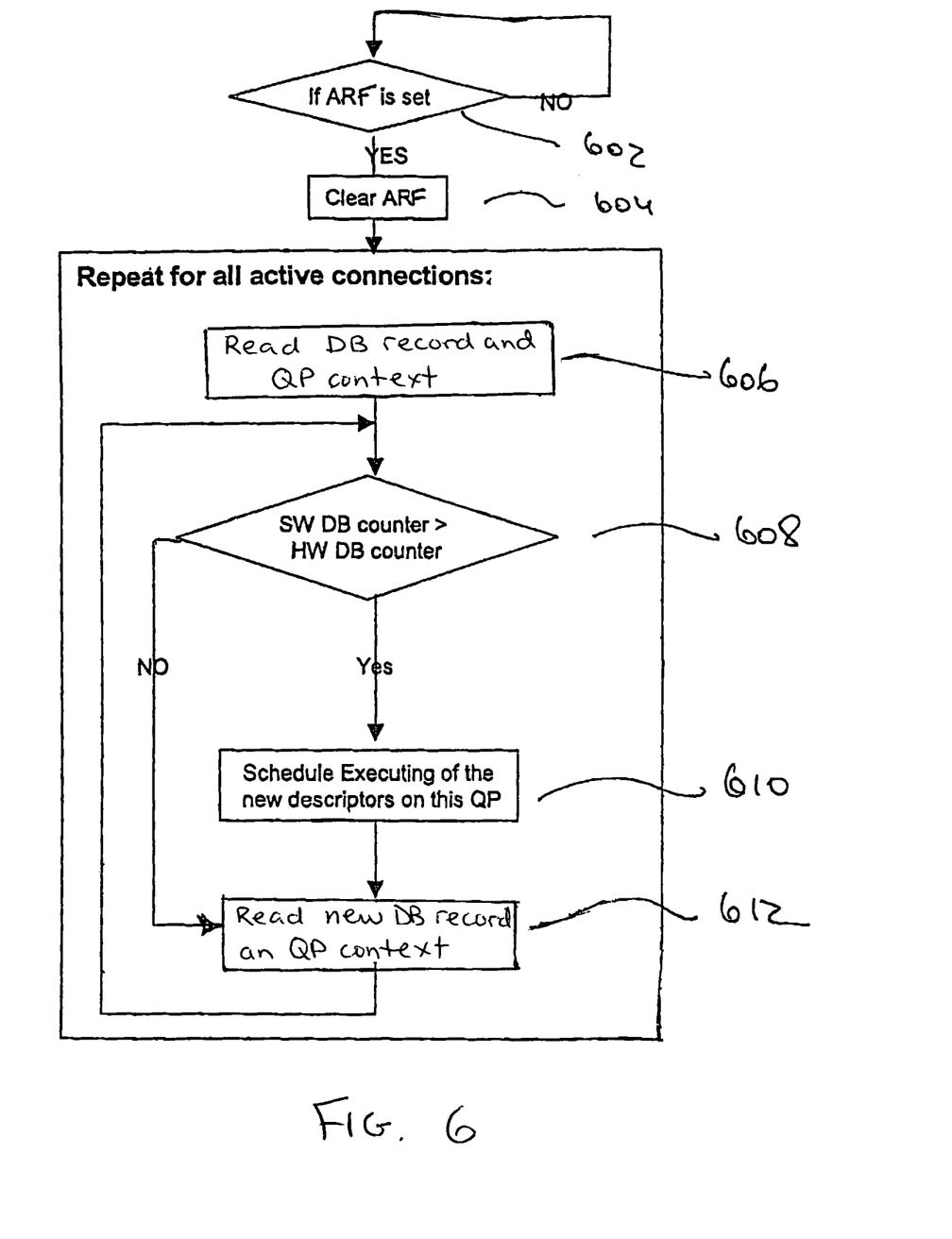
FIG. 6 described in detail the steps of recovering dropped doorbells.

The recovery of dropped doorbells is now explained in detail with reference to FIG. 6. A third check step 602 checks if the ARF is set. If the ARF is not set (doorbell not dropped in the system), the third check continues until it finds a set ARF. If such set ARF is found, the ARF is cleared (bit is turned off) in a step 604, and the recovery starts for all active connections. The doorbell record is read in a step 606, and a fourth check step 608 checks if the SW DB counter value is greater than the HW DB counter value. The calculation of "SW DB Counter>HW DB Counter" is preferably done with respect to a counter roll-over condition (very similar to the way repeated packets are detected in network protocols such as InfiniBand and TCP). For example, in the case of a 32-bit counter, "roll-over" is a condition in which the counter is incremented when its value is 0xFFFFFFFF. In order to calculate "SW DB Counter>HW DB Counter" correctly for a roll-over condition, the following rule is applied: the number of bits in the counter should be at least double the "round-up" of log 2 of the number of descriptors in the QP. The "SW DB Counter<HW DB Counter" check in FIG. 5 uses a similar calculation. A successful fourth check (Yes) indicates that there are one or more descriptors to be executed. In this case, the NIC HW schedules the execution of the new descriptors on the specific QP in a step 610, and the next doorbell record is read in a step 612. If the fourth check is unsuccessful (No), meaning that no new descriptors were found, the operation proceeds directly to step 612. Steps 606-612 are repeated for all active connections.

In summary, the present invention solves a critical problem in communications between users and network interface adapters, while advantageously reducing overhead and additional memory requirements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for preventing deadlock in communication between a user and a network interface card (NIC), the method comprising steps of:
   a. writing a doorbell associated with at least one descriptor having a descriptor QP context to a doorbell buffer in the NIC,
   b. if said doorbell buffer is full, dropping at least one doorbell from said doorbell buffer, thereby allowing a write of a new doorbell to said doorbell buffer, and
   c. if said doorbell buffer is not full, executing each descriptor associated with said written doorbell in order of descriptor posting by the user,
whereby the method enables unrestricted user-level access to the NIC.

2. The method of claim 1, wherein said step of dropping at least one doorbell from said doorbell buffer is followed by steps of:
   d. recovering each said dropped doorbell, thereby obtaining a recovered doorbell; and
   e. executing each descriptor associated with said recovered doorbell.

3. The method of claim 2, wherein said step of writing a doorbell is preceded by steps of writing said at least one descriptor to memory and updating a doorbell record, and wherein said step of recovering includes:
   i. checking if a doorbell was dropped, and if yes,
   ii. reading said doorbell record,
   iii. checking if a software doorbell counter is larger than a hardware doorbell counter, and if yes,
   iv. scheduling the execution of one or more descriptors on a relevant queue pair associated with said doorbell record.

4. The method of claim 3, wherein said doorbell buffer is a first-in first-out (FIFO) buffer.

5. The method of claim 1, wherein said step of executing each descriptor further includes:
   i. storing a respective doorbell associated with each said descriptor in said doorbell buffer,
   ii. reading said QP context of each said descriptor,
   iii. checking if said doorbell is a repeat doorbell, and if no,
   iv. executing each said descriptor.

6. The method of claim 5, wherein said step of executing each descriptor further includes dropping repeat doorbells found in said checking if said doorbell is a repeat doorbell.

7. The method of claim 1, wherein said step of executing each descriptor is preceded by the step of reading said QP context to verify access rights for said descriptor, thereby providing a QP context read response.

8. The method of claim 1, wherein said NIC is connected to an InfiniBand fabric, and wherein said at least one descriptor is a work queue element (WQE).

9. A method for resolving communication deadlock arising from overlapping doorbell write and context read response paths, comprising steps of:
   a. providing a single logical communication path common to doorbell writes and context read responses, and
   b. facilitating unsynchronized, kernel-call-free, unrestricted traffic along said single logical common path, by steps including:
   i. writing a doorbell associated with at least one descriptor to a doorbell buffer in said NIC,
   ii. dropping at least one doorbell from said doorbell buffer, thereby providing space in said doorbell buffer for at least one new doorbell, and
   iii. recovering each dropped doorbell and executing its respective associated at least one descriptor,
whereby the method enables unrestricted user-level access to a network interface adapter without having to use kernel calls.

10. The method of claim 9, wherein said step of dropping at least one doorbell occurs in response to a first check that indicates said doorbell buffer is full.

11. The method of claim 9, wherein said step of recovering each dropped doorbell includes recovering each dropped doorbell from a system memory.

12. The method of claim 9, wherein said doorbell buffer is a first-in first-out (FIFO) buffer, and wherein said dropping of at least one doorbell from said doorbell buffer includes dropping a last doorbell input into said FIFO buffer.

13. The method of claim 9, wherein said doorbell buffer is a first-in first-out (FIFO) buffer, wherein said writing a doorbell associated with at least one descriptor to a doorbell buffer includes writing a last doorbell to said FIFO buffer, and wherein said dropping of at least one doorbell from said doorbell buffer includes dropping a first doorbell from said FIFO buffer.

14. A system that enables unrestricted user-level access to a network interface card (NIC), comprising:
   a. a NIC configured to accept doorbell rings and context read responses through a single logical path,
   b. at least one host central processing unit (CPU) running at least one application, said at least one CPU connected to the NIC through an interface bus, said application operative to write descriptors associated with said doorbell rings and to update a doorbell record in a system memory, said single logical path passing through said interface bus; and
   c. a kernel call-free mechanism for facilitating unsynchronized, kernel-free traffic along a said single logical path,
whereby said NIC configuration removes the need for a separate context storage memory attached to the NIC and whereby said kernel call-free mechanism allows a practically unlimited number of users to access the NIC simultaneously without a kernel call;
wherein said NIC configuration includes a doorbell buffer for temporarily storm said doorbells, and wherein said kernel call-free mechanism includes a doorbell dropping mechanism for dropping at least one doorbell from said doorbell buffer if said doorbell buffer is full, and a recover mechanism for recovering dropped doorbells and for executing respective associated descriptors of said dropped doorbells.

15. The system of claim 14, wherein said buffer is a first-in first-out (FIFO) buffer.

16. The system of claim 14, wherein said doorbell recovery mechanism includes a software doorbell counter and a hardware doorbell counter, and means to compare between said two counters.

17. A method for obtaining kernel call-free access from a plurality of users that post doorbells to a doorbell buffer in a network interface adapter, the adapter having to obtain read responses from a system memory to allow execution of descriptors associated with each such doorbell, the method comprising steps of:
   a. responsive to a first check, dropping at least one doorbell from the doorbell buffer if the doorbell buffer is full, thereby providing space in the doorbell buffer for a respective at least one new doorbell;
   b. recovering each dropped doorbell and executing respective associated descriptors of said dropped doorbell; and
   c. responsive to same said first check, if said doorbell buffer is not full, checking if a doorbell is a repeat doorbell, and executing descriptors of each doorbell found to be not a repeat doorbell.

* * * * *

UNITED STATES PATENT AND TRADEMARK OFFICE
CERTIFICATE OF CORRECTION

| | |
|---|---|
| PATENT NO. | : 7,653,754 B2 |
| APPLICATION NO. | : 10/750762 |
| DATED | : February 21, 2010 |
| INVENTOR(S) | : Michael Kagan et al. |

It is certified that error appears in the above-identified patent and that said Letters Patent is hereby corrected as shown below:

Claim 14, column 8, line 67 should be corrected as follows;
Change
"temporarily storm said doorbells,"
to
"temporarily storing said doorbells,"

Claim 14, column 9, line 3 should be corrected as follows:
Change
"and a recover mechanism for recovering dropped doorbells"
to
"and a recovery mechanism for recovering dropped doorbells"

Claim 17, column 10, line 9 should be corrected as follows:
Change
"of said dropped doorbell;"
to
"of said each dropped doorbell;"

Signed and Sealed this

Thirtieth Day of March, 2010

David J. Kappos
*Director of the United States Patent and Trademark Office*